(12) United States Patent
Yüksel et al.

(10) Patent No.: US 11,921,521 B2
(45) Date of Patent: Mar. 5, 2024

(54) METHOD OF CONTROLLING AN AIRCRAFT, FLIGHT CONTROL DEVICE FOR AN AIRCRAFT, AND AIRCRAFT WITH SUCH FLIGHT CONTROL DEVICE

(71) Applicant: Volocopter GmbH, Bruchsal (DE)

(72) Inventors: Burak Yüksel, Heidelberg (DE); Sebastian Mores, Munich (DE)

(73) Assignee: Volocopter GmbH, Bruchsal (DE)

( * ) Notice: Subject to any disclaimer, the term of this patent is extended or adjusted under 35 U.S.C. 154(b) by 263 days.

(21) Appl. No.: 17/182,438

(22) Filed: Feb. 23, 2021

(65) Prior Publication Data
US 2021/0303004 A1 Sep. 30, 2021

(30) Foreign Application Priority Data
Mar. 30, 2020 (EP) .................................. 20166775

(51) Int. Cl.
| G05D 1/00 | (2006.01) |
| B64C 13/16 | (2006.01) |
| B64C 29/00 | (2006.01) |
| G08G 5/00 | (2006.01) |

(52) U.S. Cl.
CPC ........... *G05D 1/0858* (2013.01); *B64C 13/16* (2013.01); *B64C 29/005* (2013.01); *G08G 5/0052* (2013.01)

(58) Field of Classification Search
CPC .... G05D 1/0858; B64C 13/16; B64C 29/005; B64C 27/26; B64C 29/0025; B64C 39/04; B64C 27/08; B64C 27/32; B64C 29/02; B64C 2211/00; G08G 5/0052; B64U 30/10; B64U 30/20
See application file for complete search history.

(56) References Cited

U.S. PATENT DOCUMENTS

| 6,474,603 | B1 | 11/2002 | Kinkead et al. | |
| 7,791,529 | B2 * | 9/2010 | Filias ................... | G01S 13/589 701/4 |
| 8,942,866 | B2 * | 1/2015 | Shue ..................... | G05D 1/0858 701/4 |
| 9,488,979 | B1 * | 11/2016 | Chambers ............ | G05D 1/0088 |
| 9,499,266 | B1 | 11/2016 | Garreau | |

(Continued)

FOREIGN PATENT DOCUMENTS

| CN | 1993264 A | 7/2007 |
| CN | 105683041 A | 6/2016 |

(Continued)

*Primary Examiner* — Ian Jen
(74) *Attorney, Agent, or Firm* — Volpe Koenig

(57) ABSTRACT

A method of controlling an aircraft having multiple configurations is provided, wherein each configuration is controlled by a different control law implemented by a flight control device and transition from one configuration to another configuration is achieved by gradually blending out a control law for one configuration and by gradually increasing an impact of a control law for another configuration in the flight control device based on an estimated flight condition of the aircraft by dynamically adjusting, in the flight control device, respective maximum and minimum limit values of control volumes, which control volumes are defined by parameter ranges of control parameters in connection with a corresponding control law for the one configuration and for the other configuration, respectively.

13 Claims, 4 Drawing Sheets

(56) References Cited

U.S. PATENT DOCUMENTS

| | | |
|---|---|---|
| 10,093,415 B1 * | 10/2018 | Fortenbaugh ......... B64C 13/503 |
| 10,562,623 B1 | 2/2020 | Sloan et al. |
| 2004/0075017 A1 | 4/2004 | Sash |
| 2006/0151666 A1 | 7/2006 | Vandermey et al. |
| 2011/0024551 A1 | 2/2011 | Biest et al. |
| 2011/0184593 A1 * | 7/2011 | Swope ................... G05D 1/106 |
| | | 701/4 |
| 2013/0261853 A1 * | 10/2013 | Shue ................... G05D 1/0088 |
| | | 701/3 |
| 2013/0274963 A1 * | 10/2013 | Shue ....................... B64C 19/00 |
| | | 701/3 |
| 2016/0026190 A1 | 1/2016 | Kowalski et al. |
| 2017/0137126 A1 * | 5/2017 | Wong ................... B64C 39/024 |
| 2018/0093762 A1 | 4/2018 | Shue et al. |
| 2018/0229839 A1 * | 8/2018 | Kimchi ................... B64C 27/20 |
| 2018/0370625 A1 | 12/2018 | Netzer |
| 2019/0127056 A1 | 5/2019 | Weekes et al. |
| 2019/0155282 A1 | 5/2019 | Kim |

FOREIGN PATENT DOCUMENTS

| | | |
|---|---|---|
| CN | 109250099 A | 1/2019 |
| CN | 110831861 A | 2/2020 |
| EP | 3757004 | 12/2020 |
| WO | 2015066084 | 5/2015 |
| WO | 2015200345 A1 | 12/2015 |

\* cited by examiner

METHOD OF CONTROLLING AN AIRCRAFT, FLIGHT CONTROL DEVICE FOR AN AIRCRAFT, AND AIRCRAFT WITH SUCH FLIGHT CONTROL DEVICE

INCORPORATION BY REFERENCE

The following documents are incorporated herein by reference as if fully set forth: European Patent Application No. 20 166 775.5, filed Mar. 30, 2020.

TECHNICAL FIELD

The invention relates to a method of controlling an aircraft, to a flight control device for an aircraft, and to an aircraft with such flight control device.

BACKGROUND

Patent application EP 19 182 947.2 discloses an aircraft that is able to transition from one flight condition to another using different types of actuators. Said aircraft is able to fly or operate in a "copter mode" by using lifters, i.e., rotors with vertical axis of rotation, and in a "jet mode" by using pushers (i.e., rotors with horizontal axis of rotation) and control surfaces (i.e., wings).

Control of such systems is not trivial, especially when considering "fight of control" scenarios, in which actions of different actuators conflict with each other while trying to achieve a similar objective. As an example, with the aircraft described in EP 19 182 947.2, forward acceleration can be achieved by changing an RPM of the lifters (front and rear) as well as by increasing thrust of the pushers. The first scenario leads to change of a tilt angle of the aircraft body, while the second scenario does not require this, which creates a conflict. For reason of comfort and efficiency, the second scenario is usually chosen at increased cruise velocities, while the first scenario is used for reduced cruise velocities due to better controllability and stability.

There exists a need for a method of controlling an aircraft having multiple configurations or modes, which removes "fight of control" issues and regulates the coexistence of a plurality of controls (or control modes) efficiently.

There is also a need for an improved flight control device for an aircraft having multiple configurations or modes.

SUMMARY

The above object is achieved by proposing, according to a first aspect of the present invention, a method of controlling an aircraft having multiple configurations or modes, wherein each configuration or mode is controlled by a different control law implemented by a flight control device and transition from one configuration or mode to another configuration or mode is achieved by gradually blending out a control law for said one configuration or mode and by gradually increasing an impact of a control law for said other configuration or mode in said flight control device based on an estimated or measured flight condition of the aircraft by dynamically adjusting, in said flight control device, respective maximum and minimum limit values of control volumes, which control volumes are defined by parameter ranges of control parameters in connection with a corresponding control law, i.e., a control law for said one configuration or mode and for said other configuration or mode, respectively.

In the present context, a control volume is a multi-dimensional volume of control parameters, the number of dimensions of which corresponds to a number of physical parameters comprised in a corresponding control law, wherein every control parameter can take on values that are comprised within a range defined between said respective maximum and minimum limit values. Such maximum and minimum limit values exist for every control parameter. By gradually changing said maximum and/or minimum limit values, a corresponding control value can be adjusted, i.e., expanded or shrunk, which corresponds to increasing or decreasing an impact thereof, respectively.

Dynamically (and gradually) adjusting, in said flight control device, respective maximum and minimum limit values of control volumes allows a continuous (not discrete) switching from one control to another in a very simple and elegant way, which is highly advantageous since it avoids any discontinuous and potentially dangerous or uncomfortable behavior of the aircraft. The proposed method is not complex, yet effective.

In the proposed method, we do not activate or deactivate different control methods in a discrete manner, but in a smooth and continuous way by dynamically adjusting the maximum and minimum limits of the control volumes. In this way multiple control methods can be active simultaneously, e.g., by using state machines, without switching them off and on.

According to a second aspect of the invention, the above object can also be achieved by means of a flight control device for an aircraft having multiple configurations or modes, wherein each configuration is controlled by a different control law implemented by said flight control device, which flight control device is adapted to transition from one configuration or mode to another configuration or mode by gradually blending out a control law for said one configuration or mode and by gradually increasing an impact of a control law for said other configuration or mode in said flight control device based on an estimated or measured flight condition of the aircraft by dynamically adjusting respective maximum and minimum limit values of control volumes, which control volumes are defined by parameter ranges of control parameters in connection with a corresponding control law, i.e., for said one configuration or mode and for said other configuration or mode, respectively, which flight control device preferably is further adapted to implement a method according to any one of the dependent method claims.

According to a third aspect of the invention, the above object can also be achieved by means of an aircraft having multiple configurations or modes, wherein preferably said one configuration or mode corresponds to a copter mode of the aircraft, in which mode the aircraft performs at least one of vertical take-off, landing, hover, turn on the spot, climb or descent, all with relatively low horizontal velocities, and wherein said other configuration or mode corresponds to a jet mode, in which mode the aircraft performs at least one of level flight, turn flights, climb or descent, all with relatively higher horizontal velocities than in said copter mode, said aircraft comprising a flight control device according to said second aspect of the present invention.

In an embodiment of the method according to the invention, a given control volume is reduced in parameter range for leaving a current mode, i.e., a mode which is associated with said control volume, and is expanded in parameter range for switching or transition to a desired mode associated with said control volume. This enables a flexible control behavior.

In an embodiment of the method according to the invention, a first control volume is reduced in parameter range for leaving a current mode associated with the first control volume, and a second control volume is increased in parameter range for switching to a mode associated with the second control volume.

For instance, there could be a first control volume, defined by $u_{p1}^{max}$ and $u_{p1}^{min}$, and a second control volume, defined by $u_{p2}^{max}$ and $u_{p2}^{min}$. The second control volume is increased when the mode is changed. The first control volume is reduced accordingly (preferably only if there is no significant error in tracked states, as will be explained farther down).

The proposed control method as such is not limited to airborne vehicles, but can be applied to other systems with multiple configurations (or modes), wherein each configuration is controlled via a different control law and wherein transition from one configuration to another configuration is achieved by blending out one control law and increasing the dominance of another control law based on an estimated (or measured) operating condition of the system. The proposed method is not complex, yet effective.

Any system involving a plurality of physical actuators (e.g. airborne vehicle) consists of multiple control options. These options can be separated based on their objectives. As an example, for the aircraft of EP 19 182 947.2, lifters and pushers (together with said control surfaces), respectively, can be considered as two different control options, because they are mainly used for two different flight modes or states:

Mode-1: A "copter mode". In this mode, the aircraft performs vertical take-off, landing, hover, turn on the spot, climb or descent, all with very low horizontal velocities (compared to Mode-2).

Mode-2: A "jet mode". In this mode, the aircraft performs level flight, turn flights, climb or descent, and more all with high horizontal velocities (compared to Mode-1; a threshold for such velocity in forward direction can be defined, which threshold can be used to decide which mode should be dominant in a given situation).

According to the invention, we will consider a transition between modes, which transition does not imply a discrete switching of control options. In fact, in a given mode, different control options can be active simultaneously, if needed. In the following and in the context of the invention, the words "switching" and "transition" will be used as synonyms, unless indicated otherwise.

For better understanding, the equations of motion of such systems, which can be derived using the Newton-Euler principle or Lagrange method, can be depicted as follows, using an aircraft as an example:

$$M(x)\ddot{x}+c(x,\dot{x})+g(x)+G_1(x)u_{p1}+G_2(x)u_{p2}+ \ldots +G_n(x)u_{pn}=f_{ext},\qquad \text{Eq. 1}$$

where $x \in \mathbb{R}^m$ is an m-dimensional configuration vector of the system, e.g., positions and rotations in 3D, $M(x) \in \mathbb{R}^{m \times m}$ is a state dependent generalized moment of inertia, $c(c, \dot{c}) \in \mathbb{R}^m$ are state dependent Coriolis forces, $g(x) \in \mathbb{R}^m$ stand for gravitational forces, and $f_{ext} \in \mathbb{R}^m$ denotes external forces and torques, e.g., due to aerodynamic effects, contact, etc. Pseudo control inputs from different sets of control options are denoted $u_{pi} \in \mathbb{R}^{p_i}$, for $i=\{1, \ldots, n\}$, which are used to control the system. These pseudo-control inputs are body-fixed forces and torques that act on the system owing to different actuators comprised in the systems. They enter into the system dynamics given by Eq. 1 with a respective control input matrix $G_i(x) \in \mathbb{R}^{m \times p_i}$. These matrices may contain information of under-actuation, etc.

Under-actuation is a technical term used in robotics and control theory to describe mechanical systems that cannot be commanded to follow arbitrary trajectories in configuration space. This condition can occur for a number of reasons, the simplest of which is when the system has a lower number of actuators than degrees of freedom. In this case, the system is said to be trivially underactuated. The class of underactuated mechanical systems is very rich and includes such diverse members as automobiles or aircraft.

One or multiple control method(s) is/are used to compute the $u_{pi}$, (e.g., direct law or feedback control law, etc.). A connection between the computed pseudo-control inputs and any actual actuator control inputs $u_i \in \mathbb{R}^{k_i}$, i.e., the inputs that are actually applied to the actuators, is made by using an allocation matrix (which allocation matrix comprises knowledge of a geometric arrangement of the actuators within the system, and other actuator relevant configurations and characteristics)

$$u_{pi}=D_i u_i \qquad \text{Eq. 2}$$

where $D_i \in \mathbb{R}^{p_i \times k_i}$ is the allocation matrix. After using control methods as mentioned above, one first computes $u_{pi}$. These, however, need to be distributed to the physical actuators using actual control inputs $u_i$. Hence, a sort of inverse matrix computation is carried out in order to compute $u_{pi}$ from $u_i$. This is depicted via $$u_i=D_i^{-1}(W_i,u_i^{min},u_i^{max})u_{pi}. \qquad \text{Eq. 3}$$

Usually this inversion is done by considering a weight matrix $W_i \in \mathbb{R}^{k_i \times k_i}$, and the physical limits of each actuator, denoted, e.g., by $u_i^{min} \in \mathbb{R}^{k_i}$ and $u_i^{max} \in \mathbb{R}^{k_i}$ As an example, EP 19 182 947.2 shows an airborne vehicle, to which the present invention can be applied, with:

lifters used for said copter mode (vertical take-off, landing, etc.), i.e., Mode-1, pushers and other control surfaces (ailerons, flaps, elevators, etc.) for said jet mode (Mode-2, e.g., after reaching a predefined value for forward velocity or airspeed). Said predefined value can be used as a threshold that is to be compared with a measurement or estimation of the airspeed. Said predefined value can be heuristic, based on engineering judgement, simulations, computations or flight tests. This will be detailed further down.

For an airborne vehicle or aircraft, which has two control options (without limitation to such number), which for the aircraft of EP 19 182 947.2 correspond to said copter and jet modes, one can define one of the control options as primary and the other one as secondary. Said primary control option can be active by default in Mode-1 (also referred to as "initial mode"), and in Mode-1, i.e., during the initial mode, only primary control can be active. During transition to Mode-2, the secondary control option can be activated, such that in Mode-2 both primary and secondary options can be active. It can be advantageous if primary control option fades off slowly, while secondary control option gradually takes over full control of the system in Mode-2. This can depend on errors on physical states of the aircraft or system controlled by the primary control option. This idea will be described further in the following. Later, when switching back from Mode-2 to Mode-1, both primary and secondary control options can be active. In this case, the secondary control option fades off slowly, while the primary control option gradually takes over again the full control of the system in Mode-1. In other words: Only in the initial mode or condition (default), Mode-1 has primary control option alone. This is because one can assume that a VTOL aircraft, as disclosed in EP 19 182 947.2, will not take off with pushers and control surfaces. But later, i.e., in the air and until landing, it uses whatever option it has.

Based on Eq. 1, the system equation for an airborne vehicle with only two control options (primary and secondary; i=[1; 2]) can be written as:

$$M(x)\ddot{x}+c(x,\dot{x})+g(x)+G_1(x)u_{p1}+G_2(x)u_{p2}=f_{ext}, \quad \text{Eq. 4}$$

where $u_{p1}$ stands for the pseudo-control input corresponding to the primary control option, and $u_{p2}$ stands for the pseudo-control input corresponding to the secondary control option. Recall that actual actuator inputs are computed after necessary allocation via the use of matrix $D_1$ and $D_2$, as shown in Eqs. 2 and 3.

In a corresponding embodiment of the invention, said parameter ranges are defined between maximum and minimum limit values $u_{p1}^{max}$ and $u_{p1}^{min}$, respectively, for said one or primary mode, and maximum and minimum limit values $u_{p2}^{max}$ and $u_{p2}^{min}$, respectively, for said other or secondary mode, with $u_{p1}$ and $u_{p2}$ being (physical/pseudo) control inputs computed using the control laws for primary and secondary modes, respectively, both for controlling the aircraft motion and prior to allocation to different actuators thereof. Note that said maximum and minimum values represent upper and lower allowed limits of each component of the primary and secondary control options, respectively. It should be noted that with $u_{p1}$ and $u_{p2}$ (i.e., the $u_{pi}$) are not necessarily scalars; in fact for airborne vehicles they are usually vectors consisting of different elements or components.

Generally speaking, $u_p$ moves between two values, $u_p^{max}$ and $u_p^{min}$, and 0 lies between them. This is because one can assume that $u_p^{min}$ can be different from 0 for a more generic description of $u_p$ bounds.

There could be cases, where $u_p^{min}=0$, or it can even occur that $u_p^{min}>0$ (for example, in standard VTOL type aircraft aimed for urban air mobility, downward thrust is not "commanded". Commanded thrust is always upwards, and downwards acceleration is bounded by gravity (since one does not fall faster than with 1 g). Thus, it can be that $u_p^{min}=0$ or that $u_p^{min}>0$. In that case, $u_p^{min}$ shall be considered as "0" in this application.

If $|u_{p1}|=0$, then the system is governed purely by the secondary control option, and if $|u_{p2}|=0$, then the system is governed purely by the primary control option.

In a further embodiment of the method according to the invention, during transition both modes are active and both $u_{p1}$ and $u_{p2}$ are actively being computed. This is not limited to only two modes.

In a further embodiment of the method according to the invention, during transition, for a given timestep ts, where dt denotes a temporal distance between timesteps, a new maximum or minimum limit value $u_{pi}^{m}$, where m denotes maximum, max, or minimum, min, and i={1, ..., n}, n being a number of available modes, is calculated according to $u_{pi}^{m}(ts)=u_{pi}^{m}(ts_{-1})+\dot{u}_{pi}^{m**}(ts)\times dt$, $ts_{-1}$ being a previous timestep. This represents an efficient way of adapting said limit values and thus transiting between control modes.

In a further embodiment of the method according to the invention, derivative $\dot{u}_{pi}^{m}$ is determined from $\dot{u}_{pi}^{m}=K_i^{m}(b-u_{pi}^{m})$, $K_i^{m}$ being a positive constant and b a boundary value for $u_{pi}^{m}$, b being preferably either zero or equal to a maximum physical limit in case m denotes maximum, or equal to a minimum physical limit in case m denotes minimum. This represents a refinement of said way of adapting said limit values and thus transiting between control modes.

In a further embodiment of the method according to the invention, boundary value b is equal to zero if transition is for leaving a corresponding mode i. In contrast to this, boundary value b is equal to a maximum or minimum physical limit if transition aims at entering a corresponding mode i.

In a further embodiment of the method according to the invention, during an initiation phase prior to any transition, at least one mode is defined as primary mode by setting corresponding $u_{pi}^{min}=\ddot{u}_{pi}^{min}$ and $u_{pi}^{max}=\ddot{u}_{pi}^{max}$, $\ddot{u}_{pi}^{min}$ and $\ddot{u}_{pi}^{max}$ being a minimum physical limit and a maximum physical limit, respectively, and any other mode is defined as secondary mode by setting $u_{pi}^{min}=u_{pi}^{max}=0$. This has already been described in detail above.

In a further embodiment of the method according to the invention, when leaving said primary mode, a check is performed whether any control output from the control law of said primary mode deviates from a desired value thereof, and, if a deviation exceeds a predetermined value, $\epsilon_1$, a control volume of the primary mode is expanded again. In this way, primary control can be made available for correcting said deviation.

In a further embodiment of the method according to the invention, said deviation is calculated, e.g., in the form of a weighted squared error, preferably according to $e_1=x_1^d-x_1$, where $x_1$ denotes outputs from the control law of said primary mode and $x_1^d$ denotes said desired values, and further involves checking if $e_1^T W_1 e_1 > \epsilon_1$, where $W_1$ is a weight matrix. This represents an efficient way of carrying out an error correction.

In a further embodiment of the method according to the invention, when adapting maximum and minimum limit values of control volumes, a check is performed whether or not the adapted maximum and minimum limit values for a given mode, i, lie in a predefined area around zero, in which case $u_{pi}$ is set to zero. This can efficiently reduce a so-called bang-bang behaviour (i.e., unsteady fluctuation around zero).

In a preferred embodiment of the method according to the invention, as already stated above, said one configuration corresponds to a copter mode of the aircraft, in which mode the aircraft performs at least one of vertical take-off, landing, hover, turn on the spot, climb or descent, all with relatively low horizontal velocities, and said other configuration corresponds to a jet mode, in which mode the aircraft performs at least one of level flight, turn flights, climb or descent, all with relatively higher horizontal velocities than in said copter mode, wherein preferably a threshold value for such horizontal velocity in forward direction is defined for differentiating between modes.

In a further embodiment of the method according to the invention, a horizontal velocity relative to surrounding air of the aircraft is measured and used as a trigger for switching from copter mode to jet mode, and vice versa. This represents an easy way of transiting between the above-mentioned configurations.

In a further embodiment of the method according to the invention, a horizontal velocity relative to surrounding air of the aircraft is estimated using a pilot control input relating to a forward motion, comprising:
  normalizing said pilot control input;
  low-pass filtering said pilot control input;
  using said low-pass filtered and normalized pilot input as estimated normalized forward speed; and
  assigning a threshold for the estimated normalized forward speed in order to determine when to switch from copter mode to jet mode, and vice versa.

This represents an alternative that can be employed if no airspeed measurement is available.

BRIEF DESCRIPTION OF THE DRAWINGS

Advantageous further embodiments of the invention will now be described in connection with the appended drawings.

DETAILED DESCRIPTION

Figure 1:
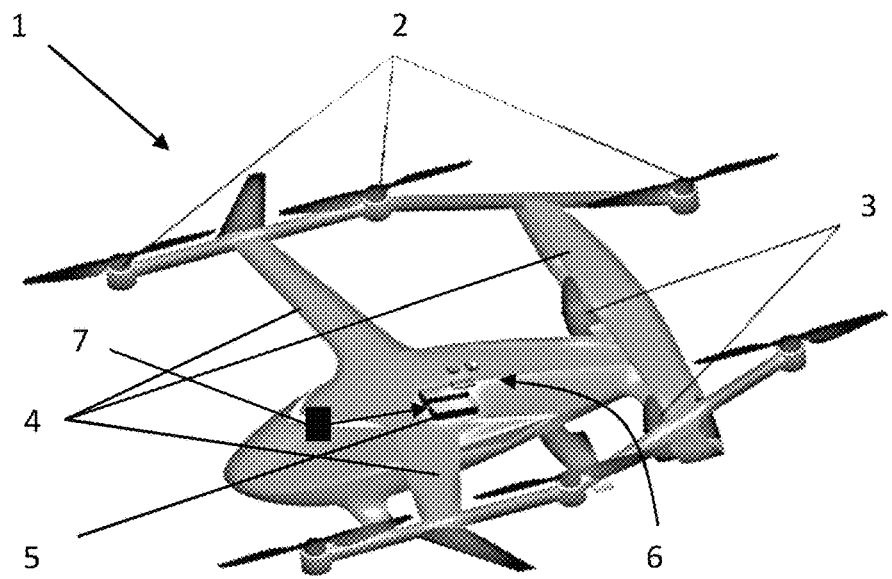
FIG. 1 shows an aircraft 1 that can be operated using at least two different control options or control modes.

FIG. 1 shows an aircraft 1 that can be operated using at least two different control options or control modes. The aircraft has lifters 2, i.e., rotors with essentially vertical axis of rotation, and pushers 3, i.e., rotors with essentially horizontal axis of rotation. While lifters 2 are used for, e.g., hover flight, pushers 3 can be used for forward travel which exceeds a certain threshold velocity. In this way, operating the aircraft 1 by using lifters 2 and by using pushers 3 (together with control surfaces, e.g., flaps, ailerons, elevators, etc.—some of them being denoted by reference numeral 4), respectively, can be regarded as two separated control options or modes. Using lifters 2 can be regarded as a copter mode, whereas using pushers 3 can be regarded as a jet mode. Reference numeral 5 denotes a flight controller or flight control unit/device in operational connection with different sensors 6, which sensors measure different physical parameters of the aircraft 1, in particular its airspeed (velocity relative to the ambient air). Flight controller 5 uses different control laws to control, inter alia, lifters 2 and/or pushers 3 based on data provided by sensors 6 and pilot input (from pilot input device 7, e.g., a joystick) or data from an autonomous system which replaces the pilot. To this end, flight controller 5 implements a control algorithm that will be explained in detail below.

Figure 2:
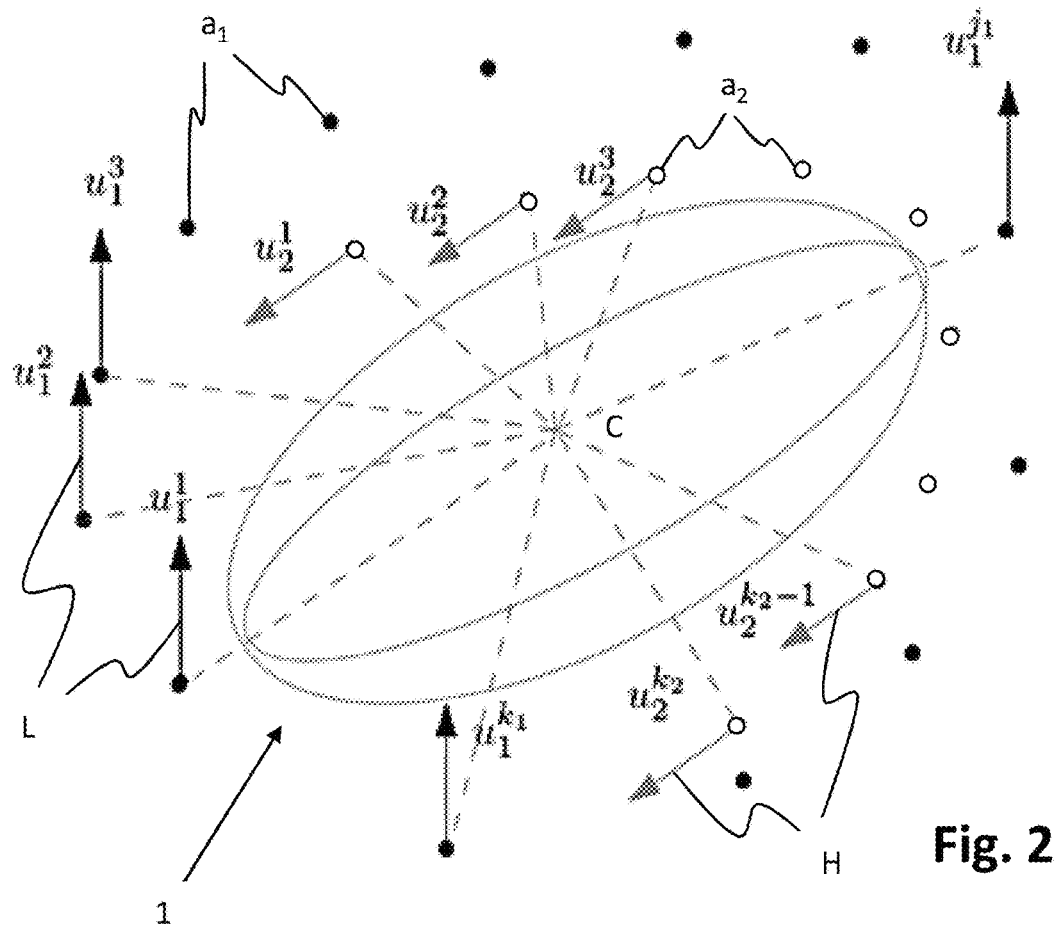
FIG. 2 shows a system with multiple sets of control options.

FIG. 2 shows a relatively generic sketch of a system (e.g., the aircraft 1 of FIG. 1) with multiple (e.g., two) sets of control options (denoted $u_1, u_2$), where actuators corresponding to $u_1$, i.e., actuators that are active while the system is controlled according to a corresponding mode, are depicted with solid dots $a_1$; there are a number $k_1$ of actuators $a_1$, they create forces in upward direction (e.g., lift), as depicted by vertical arrows L. The actuators $a_2$ corresponding to $u_2$ are depicted with hollow dots. There are a number $k_2$ of actuators $a_2$, and they create horizontal forces (e.g., forward), as depicted by horizontal arrows H. Dashed lines denote a position a given actuator $a_1$, $a_2$ relative to a center C (center of gravity) of the system. Note that upward or horizontal directions (L, H) and numbers of control options ("1", "2") are chosen as an example for better understandability. Note that the method proposed here is not limited to this example.

In FIG. 2, $u_i^j$ denotes a control input for actuator j, where $j=\{1, \ldots, k_i\}$, in the context of control option i. Note that in general, a given actuator can be involved in more than more control option. The nature and position of the actuators forms the basis for the allocation matrix mentioned above.

Figure 3:
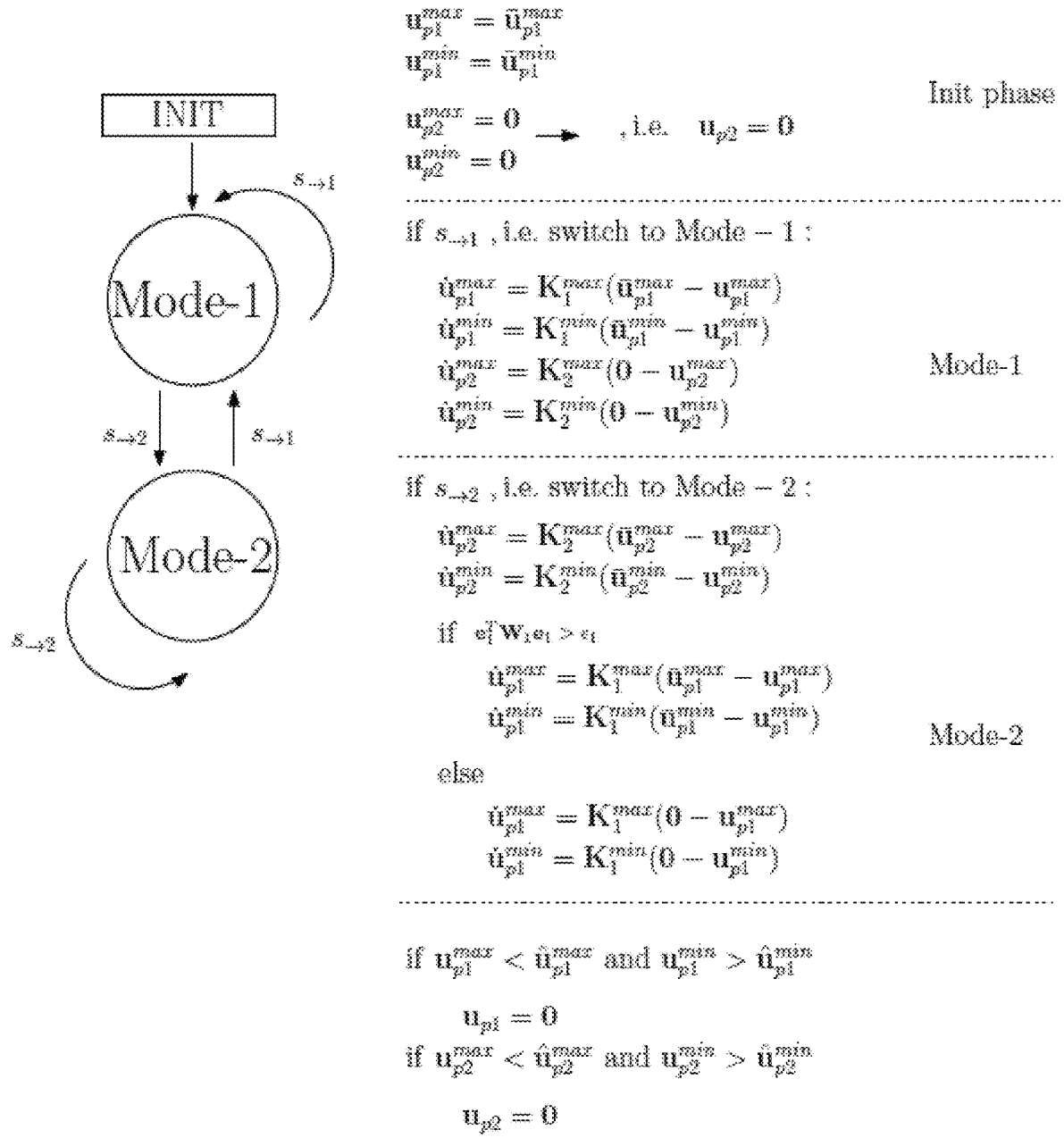
FIG. 3 shows details of the switching or transition mechanism between two control modes.

In FIG. 3, details of the switching or transition mechanism between two control modes Mode-1, Mode-2 as an embodiment of the method according to the invention are shown in detail. $u_{p1}$ and $u_{p2}$ refer to corresponding pseudo control inputs, which will generally be represented by vectors, the elements or components of which represent a solution of Eq. 4, such that they are computed using dedicated control laws in order to control the system represented in Eq. 4 in a stable and performant way. The mechanism can be implemented as an algorithm by flight controller 5 (cf. FIG. 1; flight controller will implement a controller for Mode-1 and a controller for Mode-2, respectively, which are active simultaneously).

When performing the method, boundaries of the (pseudo) control volumes spanned by the elements of $u_{p1}, u_{p2}$ are adjusted as described on the right side of FIG. 3. Maximum and minimum values $u_{pi}^{min}, u_{pi}^{max}$; $i=[1; 2]$, of all elements of the pseudo control inputs are dynamically adjusted depending on the current mode, thus adjusting the respective control volumes and changing the dominance of the corresponding controllers. Note that, e.g., $u_{p1} \in \mathbb{R}^4$, when it consists of control thrust and control torques around roll, pitch and yaw axes; hence by maximum and minimum values we consider different maximum and minimum values for each dimension or component. $u_{pi}^{min}$ and $u_{pi}^{max}$ denote a minimum physical limit and a maximum physical limit, respectively, i.e., a vector with a corresponding value for every dimension of pseudo control volume.

First, during an init phase (initiation phase, "INIT") that can be performed on the ground in the case of an aircraft, prior to any transition at least one mode ("Mode-1" according to FIG. 3) is defined as primary mode by setting corresponding $u_{pi}^{min} = \bar{u}_{pi}^{min}$. Any other mode ("Mode-2" according to FIG. 3) is defined as secondary mode by setting $u_{pi}^{min} = u_{pi}^{max} = 0$. This has already been described in detail above. The primary mode is controlled by a so-called primary controller, while the secondary mode is controlled by a so-called secondary controller.

In FIG. 3, $s_{\rightarrow 1}$ denotes switching to Mode-1 (or staying in said mode), and $s_{\rightarrow 2}$ denotes switching to Mode-2 (or staying in said mode). This is graphically illustrated on the left-hand side of FIG. 3.

When switching, i.e., during transition, derivatives $\dot{u}_{pi}^{m}$ with respect to time are used for calculating the new limit values $u_{pi}^{m}$, which is equivalent to saying that the control volume is adjusted (expanded or shrunk). Throughout this text, m denotes either maximum, max, or minimum, min. For a given timestep ts, where dt denotes a temporal distance between timesteps, a new maximum or minimum limit value $u_{pi}^{m}$, where $i=\{1, \ldots, n\}$, n being a number of available modes, e.g. two, is calculated by using said time derivatives $\dot{u}_{pi}^{m}$ according to $u_{pi}^{m}(ts) = u_{pi}^{m}(ts_{-1}) + \dot{u}_{pi}^{m}(ts) \times dt$, $ts_{-1}$ being a previous timestep. This represents an efficient and differentiable (smooth) way of adapting said limit values and thus transiting between control modes.

FIG. 3 shows said derivatives and calculation thereof for Mode-1 and Mode-2, respectively. $K_{1,2}^{min,max}$ are (positive) constants. The equations starting with $\dot{u}_{pi}^{m**}$ can be referred to as u-dynamics. They are first order system dynamics are determined by positive gains $K_{1,2}^{min,max}$. The $K_{1,2}^{min,max}$ are computed as a function of controlled system dynamics and specific actuator characteristics used for relevant control modes, e.g., actuation time and control bandwidths. Overall u-dynamics has the behavior of a low-pass filter.

Moreover, in Mode-2 (or when switching to Mode-2) a weighted squared error is used for the states or outputs that are actively controlled by the primary controller, since both controllers are active simultaneously. Consider $e_1 = x_1^d - x_1$, where $x_1$ collects the states/outputs controlled by the primary controller, e.g., altitude, roll, pitch and yaw angles and their derivatives, and $u_{p1} \in \mathbb{R}^4$, when it consists of control thrust and control torques around roll, pitch and yaw axes. Said weighted squared error can be determined using $e_1^T W_1 e_1 > \epsilon_1$, where $W_1$ is a weight matrix. Said weight matrix $W_1$ differs from that in Eq. 3. It is weighting the errors in states that we are interested in controlling/tracking (e.g., 3D attitude and altitude states; in that case $W_1$ is a 4×4 matrix, if the errors in the derivatives of these states are ignored). In Eq. 3, $W_1$ was a $k_f \times k_f$ matrix.

If the weighted squared errors are greater than a predefined threshold ($\epsilon_1$), i.e., if the "if" condition in Mode-2 is fulfilled, then the control volumes of the primary controller are expanded again, as indicated, making the primary controller available for correcting the errors (in fact, in this case the time derivatives for $u_{p1}^{m**}$. correspond to those for Mode-1. If said errors are less or equal than this predefined threshold $\epsilon_1$, i.e., if the "else" condition in Mode-2 is fulfilled, then primary control option is not needed and hence the boundaries of its volume can be shrunk. Finally, its impact on the overall control will vanish.

Note that both primary and secondary control options are active, i.e. the control laws for both are actively being computed. However, the boundaries of the allowed control volume, and hence their impact on the overall control of the aircraft, are actively adjusted. In this way we do not need to discretely switch from one control method to another, but transition occurs in a smooth and continuous way.

Note that an error in derivatives of the controlled states can also be considered, e.g., $\dot{e}_1 = \dot{x}_1^d - \dot{x}_1$, without loss of generality. Also note that in the proposed algorithm, the primary controller option controls the airborne vehicle (aircraft) and its states already in the initial phase, i.e., the airborne vehicle is initially controlled by the primary control option. Then, if a condition occurs for switching to Mode-2 the airborne vehicle is in a new mode.

As already stated, for each mode there are different dynamics for adjusting the maximum and minimum values of primary and secondary pseudo control inputs ($u_{p1}^{max}$, $u_{p1}^{min}$, $u_{p2}^{max}$ and $u_{p2}^{min}$) as shown on the right side of FIG. 3. Recall that each of these values are not necessarily scalars, in fact in general for airborne vehicles they are vectors consisting of different elements. Note that known physical boundaries or limits to these values, that are never to be exceeded, are depicted with $\bar{u}_{p1}^{max}$, $\bar{u}_{p1}^{min}$, $\bar{u}_{p2}^{max}$ and $\bar{u}_{min}$.

Also note the two last "if" conditions at the bottom of FIG. 3. They represent the following logic: If a component or dimension of the primary or secondary control option, respectively, is very close to zero (i.e., comprised within a "0-area" with lower boundary $\hat{u}_{p1}^{min}$ and $\hat{u}_{p2}^{min}$ for primary and secondary control options, respectively, and with upper boundary $\hat{u}_{p1}^{max}$ and $\hat{u}_{p2}^{max}$ for primary and secondary control options, respectively) then for those components, the corresponding pseudo control input is actively set to zero. This creates a so-called dead-zone, for avoiding any unstable or "bang-bang" behavior.

Figure 4:
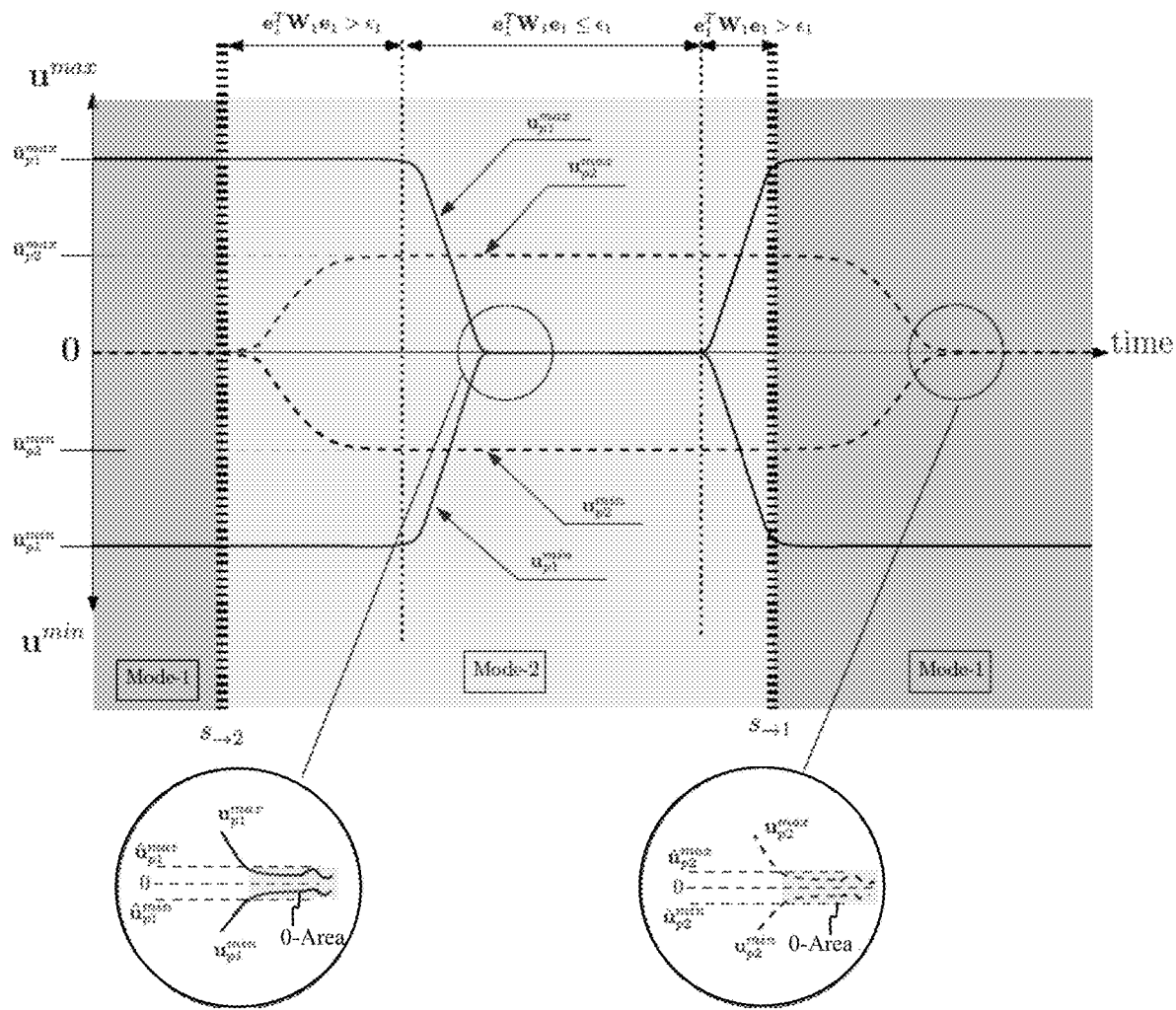
FIG. 4 shows an example, where boundaries of the control volumes of primary and secondary control options are dynamically changed in accordance with the present invention.

See FIG. 4 for an example, where the upper and lower boundaries of the control volumes of primary and secondary control options are dynamically changed for different conditions and in accordance with the present invention.

In FIG. 4, the solid lines illustrate the evolution of the upper and lower limit values, $u_{p1}^{max}$, $u_{p1}^{min}$ for primary control during a transition from Mode-1 to Mode-2 and back to Mode-1. The dashed lines shown the same temporal evolution of the upper and lower limit values, $u_{p2}^{max}$, $u_{p2}^{min}$ for secondary control.

Further in FIG. 4, the encircled areas provide detailed view of regions, in which said limit values come close to zero. In said detailed views, one can see said 0-areas defined around zero by lower boundaries $\hat{u}_{p1}^{min}$, $\hat{u}_{p2}^{min}$ and upper boundaries $\hat{u}_{p1}^{max}$, $\hat{u}_{p2}^{max}$, respectively. Within said areas, a corresponding pseudo control input is preferably set to zero.

In particular, for airborne vehicles of the type shown in FIG. 1, transition from Mode-1 to Mode-2 can be triggered, for instance, by a threshold in forward speed (if measured and available w.r.t. the air), or by estimation based on pilot control input (cf. FIG. 1). The latter case is illustrated in FIG. 5.

Figure 5:
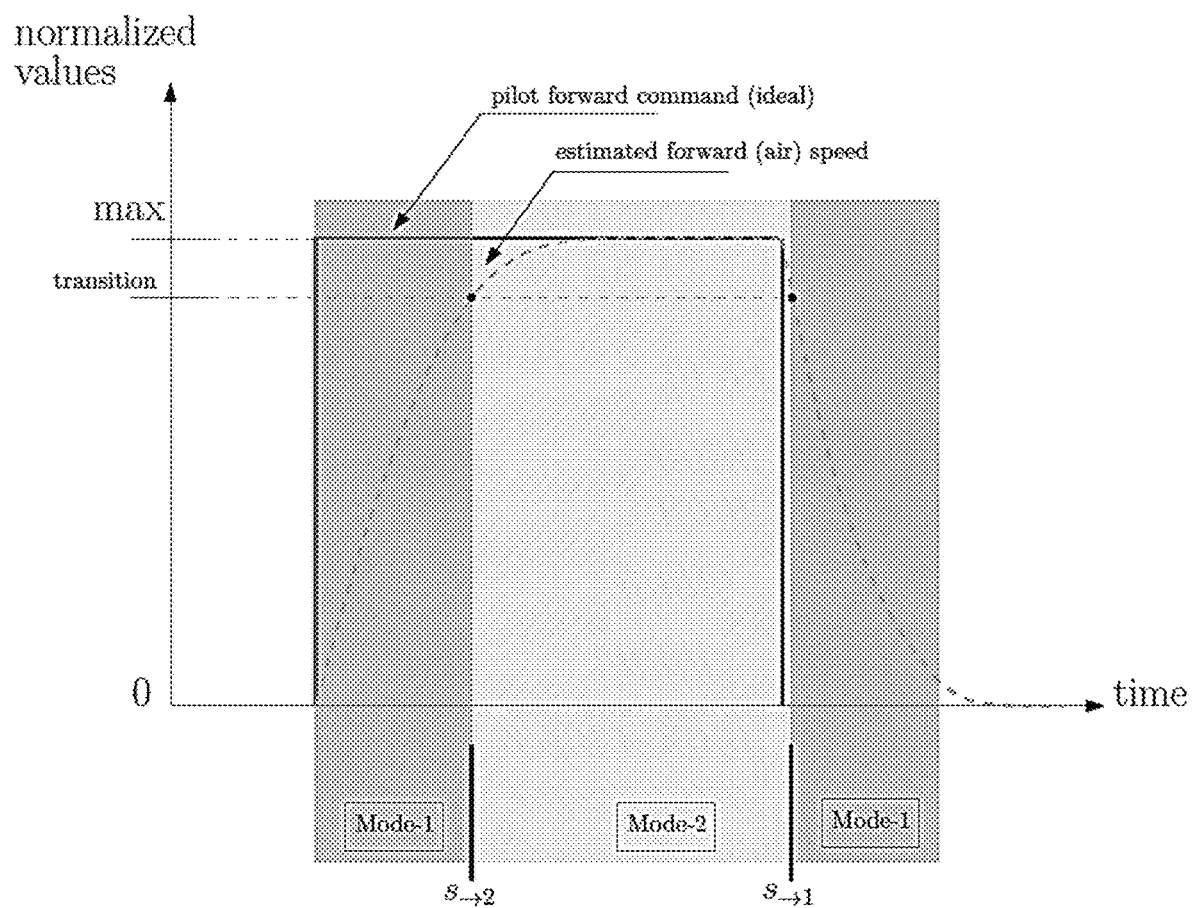
FIG. 5 shows using low-pass filtered and normalized pilot input as estimated normalized forward speed.

As shown in FIG. 5, the pilot control input is preferably normalized, and then low-pass filtered. The low-pass filtered and normalized pilot input thus obtained (i.e., input relating to a forward motion of the aircraft) can be regarded as estimated normalized forward speed (dashed curve in FIG. 5). Using simulations and flight test data, a threshold can be assigned for said normalized estimated forward speed in order to determine when to switch from Mode-1 to Mode-2, or from Mode-2 to Mode-1 (i.e., $s_{\to 1}$ and $s_{\to 2}$, respectively).

In FIG. 5, said threshold is denoted "transition". As long as the dashed curve is below said threshold, the aircraft is operated in Mode-1. If the dashed curve rises above said threshold, transition to Mode-2 is initiated, as described, e.g., in connection with FIGS. 3 and 4. Once the dashed curve falls below said threshold again, transition back to Mode-1 is initiated, as described, e.g., in connection with FIGS. 3 and 4.

Note that the invention can also be used (and might be very useful) when the aircraft is flying autonomously. In that case, one would not be using the forward speed estimation based on pilot input.

Actually, for a safe and performant autonomous flight, forward speed measurement (if available w.r.t. air) may be regarded as essential. Hence, in that case speed measurement (possibly supported with different types of estimates) could advantageously be used.

The invention claimed is:

1. A method of controlling an aircraft having multiple configurations, the method comprising:
controlling each said configuration by a control law implemented by a flight controller, wherein:
a first configuration includes a copter mode of the aircraft controlled by a first control law, when in the copter mode the aircraft performs at least one of vertical take-off, landing, hover, turn on a spot, climb or descent, with relatively low horizontal velocities;
a second configuration includes a jet mode of the aircraft controlled by a second control law, when in the jet mode the aircraft performs at least one of level flight, turn flights, climb or descent, with relatively higher horizontal velocities than in said copter mode; and
a threshold value for said horizontal velocity in a forward direction is defined for differentiating between said copter mode and jet mode;
measuring a horizontal velocity relative to surrounding air of the aircraft and using the horizontal velocity as a trigger for switching from the copter mode to the jet mode, and vice versa; and
transitioning from the first configuration to the second configuration by gradually blending out the first control law for the first configuration and by gradually increasing an impact of the second control law for the second configuration in said flight controller based on an estimated or measured flight condition of the aircraft by dynamically adjusting, in said flight controller, respective maximum and minimum limit values of control volumes that are defined by parameter ranges of control parameters in connection with the corresponding control law for the second configuration.

2. The method of claim 1, further comprising reducing said control volume in the parameter range for leaving a current one of said configurations associated with said control volume, and expanding the control volume in the parameter range for switching to a desired one of said configurations associated with said control volume.

3. The method of claim 2, wherein said parameter ranges are defined between maximum and minimum limit values $u_{p1}^{max}$_p1^min respectively, for said first configuration, and maximum and minimum limit values $u_{p2}^{max}$_p2^min respectively, for said second configuration, with $u_{p1}$ and $u_{p2}$ being pseudo control inputs computed using the control laws for said first and second configurations, respectively, both for controlling the aircraft motion and prior to allocation to different actuators thereof.

4. The method of claim 3, wherein during the transitioning, both of the configurations are active and both $u_{p1}$ and $u_{p2}$ are actively being computed.

5. The method of claim 4, further comprising during the transitioning, for a given timestep ts, where dt denotes a temporal distance between timesteps, calculating a new maximum or minimum limit value $u_{pi}^{m}$, where m denotes maximum, max, or minimum, min, and i={1, ..., n}, n being a number of available ones of the configurations, according to $u_{pi}^{m}(ts)=u_{pi}^{m}(ts_-)+\dot{u}_{pi}^{m**}(ts)\times dt$, $ts_{-1}$ being a previous timestep.

6. The method of claim 5, further comprising determining derivative $\dot{u}_{pi}^{m}$ from $\dot{u}_{pi}^{m}=K_i^{m}(b-u_{pi}^{m})$, $K_i^{m}$ being a positive constant and b a boundary value for $u_{pi}^{m}$, b being either zero or equal to a maximum physical limit in case m denotes maximum or equal to a minimum physical limit in case m denotes minimum.

7. The method of claim 6, wherein boundary value b is equal to zero if the transitioning is for leaving a corresponding one of the configurations i.

8. The method of claim 6, wherein during an initiation phase. prior to any of the transitioning, at least one of the configurations is defined as a primary configuration by setting corresponding $u_{pi}^{min}=\bar{u}_{pi}^{min}$ $u_{pi}^{max}=\bar{u}_{pi}^{max}$ min $\bar{u}_{pi}^{max}$ a minimum physical limit and a maximum physical limit, respectively, and any other one of the configurations is defined as a secondary configuration by setting $u_{pi}^{min}=u_{pi}^{max}=0$.

9. The method of claim 8, further comprising, when leaving said primary configuration, performing a check on whether any control outputs from the control law of said primary configuration deviate from desired values thereof, and, if a deviation exceeds a predetermined value, $\epsilon_1$, a control volume of the primary configuration is expanded again.

10. The method of claim 9, further comprising calculating said deviation as a weighted squared error, according to $e_1=x_1^d-x_1$, where $x_1$ denotes outputs from the control law of said primary configuration and $x_1^d$ denotes said desired values, and checking if $e_1^T W_1 e_1 > \epsilon_1$, where $W_1$ is a weight matrix.

11. The method of claim 3, wherein when adapting maximum and minimum limit values of control volumes, performing a check on whether or not the adapted maximum and minimum limit values for a given one of the configurations, i, lie in a predefined area around zero, in that case $u_{pi}$ is set to zero.

12. The method of claim 1, further comprising estimating a horizontal velocity relative to surrounding air of the aircraft using a pilot control input relating to a forward motion, by:
normalizing said pilot control input;
low-pass filtering said pilot control input;
using said low-pass filtered and normalized pilot input as an estimated normalized forward speed; and
assigning a threshold for the estimated normalized forward speed in order to determine when to switch from the copter mode to the jet mode, and vice versa.

13. A method of controlling an aircraft having multiple configurations, the method comprising:
controlling each said configuration by a control law implemented by a flight controller, wherein:
a first configuration includes a copter mode of the aircraft controlled by a first control law, when in the copter mode the aircraft performs at least one of vertical take-off, landing, hover, turn on a spot, climb or descent, with relatively low horizontal velocities;
a second configuration includes a jet mode of the aircraft controlled by a second control law, when in the jet mode the aircraft performs at least one of level flight, turn flights, climb or descent, with relatively higher horizontal velocities than in said copter mode; and
a threshold value for said horizontal velocity in a forward direction is defined for differentiating between said copter mode and jet mode;
estimating the horizontal velocity relative to surrounding air of the aircraft using a pilot control input relating to a forward motion, by:
normalizing said pilot control input;
low-pass filtering said pilot control input;
using said low-pass filtered and normalized pilot input as an estimated normalized forward speed; and
assigning a threshold for the estimated normalized forward speed in order to determine when to switch from the copter mode to the jet mode, and vice versa; and
transitioning from the first configuration to the second configuration by gradually blending out the first control law for the first configuration and by gradually increasing an impact of the second control law for the second configuration in said flight controller based on an estimated or measured flight condition of the aircraft by dynamically adjusting, in said flight controller, respective maximum and minimum limit values of control volumes that are defined by parameter ranges of control parameters in connection with the corresponding control law for the second configuration.

\* \* \* \* \*